June 24, 1924.
H. E. MARTIN
LOG CART
Filed April 13, 1923   2 Sheets—Sheet 1
1,499,023
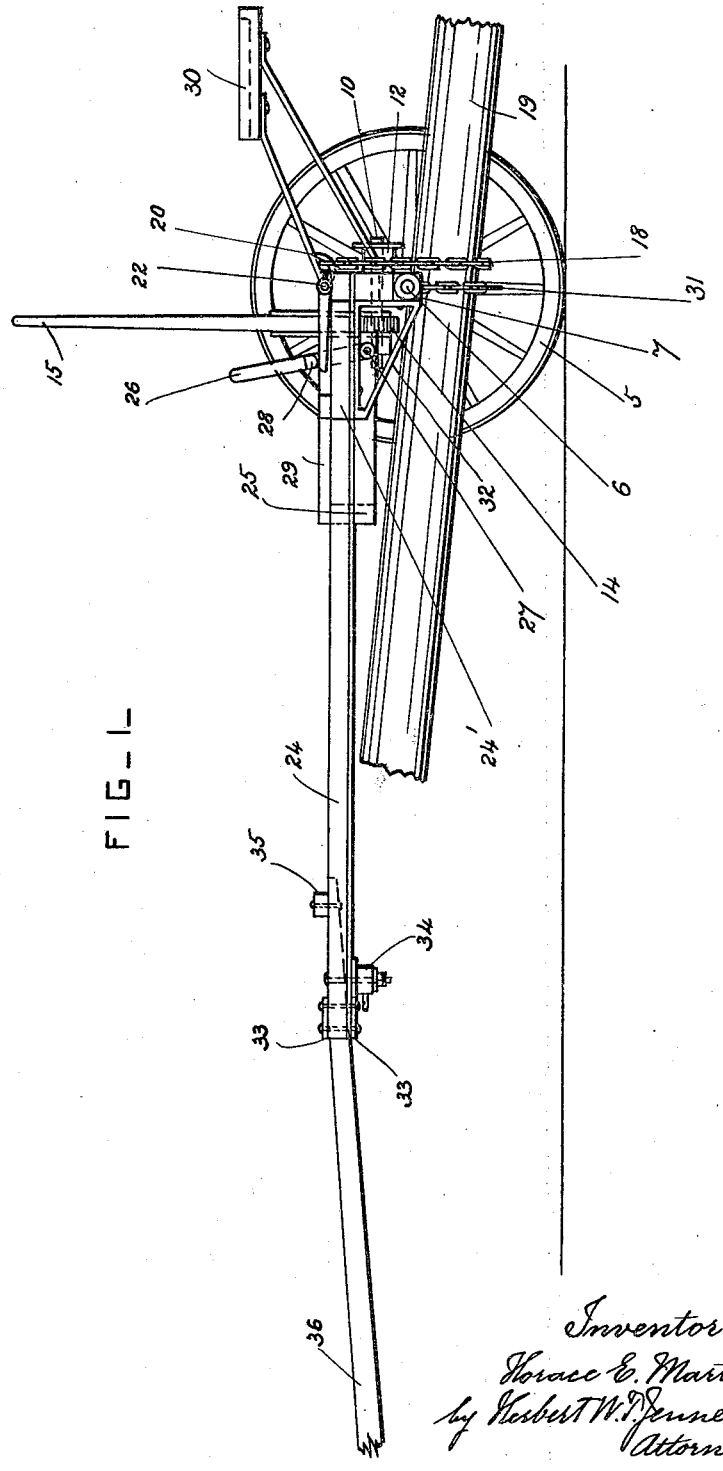

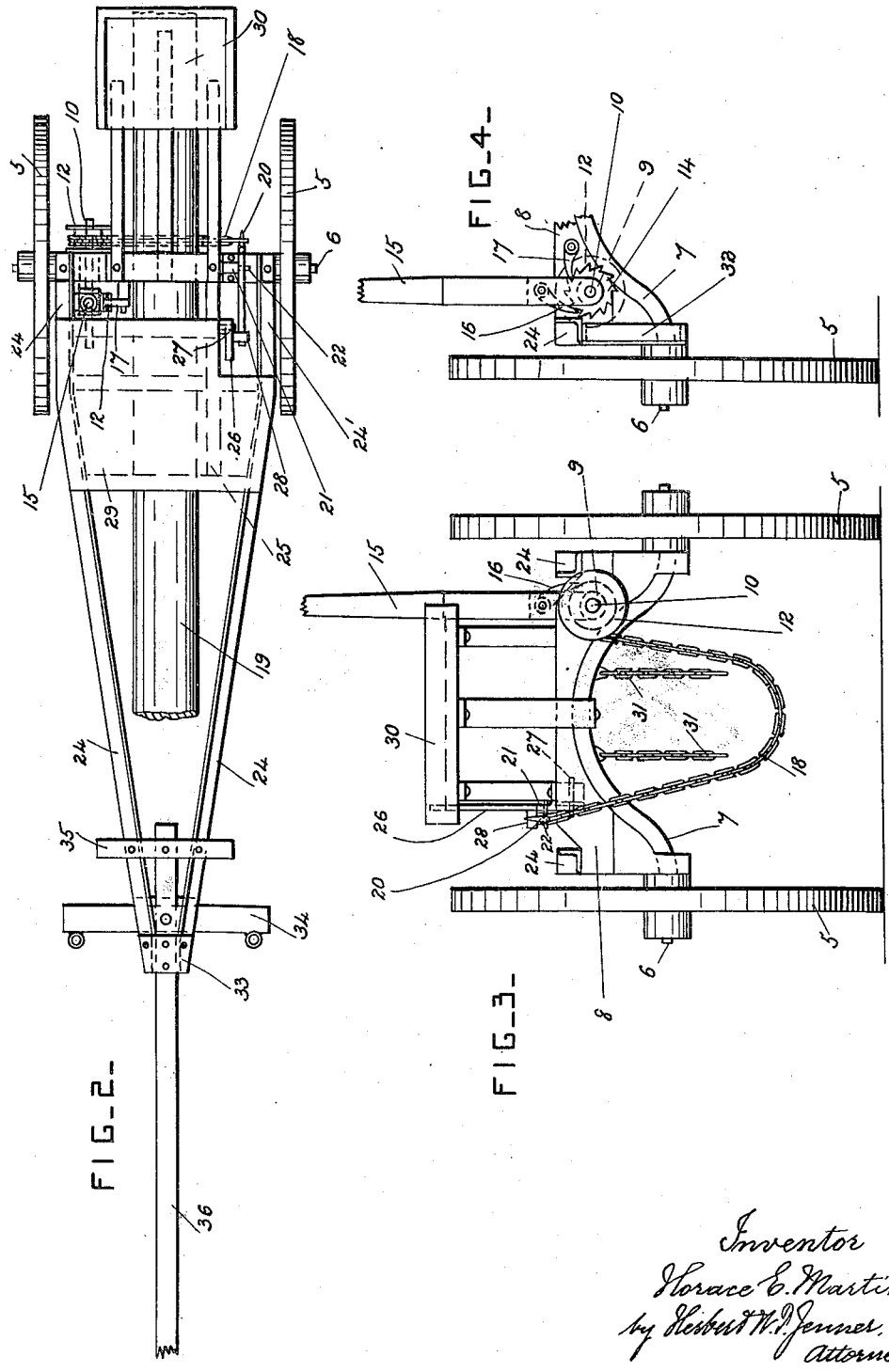
June 24, 1924.
H. E. MARTIN
LOG CART
Filed April 18, 1923    2 Sheets-Sheet 2
1,499,023
Inventor
Horace E. Martin,
by Herbert W. P. Jenner,
Attorney.

Patented June 24, 1924.

1,499,023

UNITED STATES PATENT OFFICE.

HORACE E. MARTIN, OF ATHENS, GEORGIA.

LOG CART.

Application filed April 18, 1923. Serial No. 632,966.

*To all whom it may concern:*

Be it known that I, HORACE E. MARTIN, a citizen of the United States, residing at Athens, in the county of Clarke and State of Georgia, have invented certain new and useful Improvements in Log Carts, of which the following is a specification.

This invention relates to carts used for transporting logs of wood; and it consists in the novel construction and combination of the parts hereinafter fully described and claimed whereby the log is raised from the ground, is drawn along with great facility, and may be dumped without having to stop the cart.

In the drawings, Figure 1 is a side view of a cart constructed according to this invention, with one road wheel removed. Fig. 2 is a plan view of the cart; and Fig. 3 is an end view of the same. Fig. 4 is a front view of the ratchet toothed wheel and lever.

The road wheels 5 of the cart are journaled on spindles 6 at the ends of an arch-shaped axle 7, having a re-inforcing bolster or blocks of wood 8 secured to its upper part. A bearing 9 is secured to the axle, in one of the blocks of wood 8, and is arranged to one side of the center line of draft. A shaft 10 is journaled in the bearing 9, and is arranged longitudinally of the cart. A drum 12 is secured on the rear end portion of the shaft 10 behind the bearing 9.

A suitable operating mechanism is connected to the front end portion of the shaft 10, on the other side of the bearing from the drum. A ratchet toothed wheel 14 is secured on the shaft 10, and a lever 15 is pivoted on the said shaft, and is provided with a pivoted push pawl 16 which engages with the teeth of the ratchet wheel. A check pawl 17 is pivoted to the axle, and also engages with the teeth of the ratchet wheel. A flexible connection 18, such as a cord, chain or wire cable, is wound upon and secured to the drum 12, and is passed under the log 19. The front part of the log is supported by the sling chain 18, and its rear end part is allowed to trail along on the ground.

The free end of the flexible connection is attached to a disengageable fastening device 20, arranged on the other side of the center line of draft from the drum. This fastening device is preferably a hooked catch which is pivoted by a pin 22 to a bracket 21 secured to the axle. The winding drum is arranged to the rear of the axle, and the hooked catch 20 also projects on the rear side of the axle, so that the sling 18 is supported parallel to the axle, and the log is held parallel to the cart wheels and the line of draft, which is desirable.

The hounds 24 are secured to the axle, and a frame 25 is also secured to the axle and to the rear end portions of the hounds. A lever 26 is pivoted to the frame 25 by a pin 27, and has a laterally projecting lug 28 which engages with the front end portion of the hooked catch, so that it normally holds the free end portion of the flexible connection 18 from slipping.

A platform 29 for the driver is secured to the frame 25 in front of the axle, and the seat 30 for the driver is secured to the rear of the axle, so that the weight of the driver may counterbalance the weight of the hounds. Fastening chains 31 are suspended from the axle, and when the cart is used for hauling logs before carrying them, the tongs which engage with the logs are connected with the chains 31, and two logs can be hauled simultaneously.

The hounds 24 are preferably formed of angle-iron and wooden bars bolted or riveted together, and their rear end portions 24' are arranged parallel to each other so as to afford plenty of space for the log. Brackets 32 are also secured to the parts 24' and to the axle. This construction of the hounds enables the brackets to be secured so as to brace the hounds securely to the axle without in any way interfering with the log, and permitting the loaded cart to turn around.

The middle and front end portions of the hounds are inclined towards each other, and the front end portions are secured to plates 33. A doubletree 34 is pivoted to the lower plate 33, and is provided with singletrees for the horses in the usual way. A crossbar 35 is secured to the upper side of the hounds a short distance to the rear of the plates 33, and the draft tongue 36 is secured to the crossbar and between the plates 33. The draft tongue is inclined downwardly and forwardly with respect to the hounds, so that the hounds may be arranged substantially horizontal and clear of the front end of the log, and so that the front end of the draft tongue may be at the most advantageous height above the ground for hauling purposes. This arrangement permits a longer portion of the log to project in front of the sling 18.

The sling chain or flexible connection 18 is passed under the log or logs, and is attached to the hooked catch. The log is raised off the ground by oscillating the hand lever 15, and when the log has been carried to its destination it is dumped by releasing the catch from the lever 26. The driver can operate the lever 26 with one foot, and can release the log without having to stop the cart.

What I claim is:

1. In a log cart, an axle, a winding drum arranged to the rear of the axle with its axis arranged crosswise of the axle, a disengageable catch supported by the axle and projecting rearwardly thereof, and a sling for raising and supporting the log arranged parallel to the axle and having its ends operatively connected with the said drum and catch.

2. In a log cart, an axle, a shaft supported crosswise of the axle, a winding drum secured on the rear end portion of the said shaft, an operating device for revolving the shaft step by step connected to its front end portion, a disengageable fastening device supported by the axle, and a sling for raising and supporting the log arranged crosswise of the cart between the said drum and fastening device.

3. In a log cart, an axle, a winding mechanism supported by the axle, a hooked catch pivoted crosswise of the axle, a sling for raising and supporting the log arranged crosswise of the cart between the said winding mechanism and hooked catch, and a pivoted disengaging lever provided with a laterally projecting lug which normally engages with the hooked catch and holds it connected to the sling.

4. In a log cart, an axle, a sling for supporting the log from the axle, hounds secured to the axle, a crossbar secured above the front end portions of the hounds, and a draft tongue secured to the said hounds and crossbar and projecting downwardly at an angle to the hounds.

In testimony whereof I have affixed my signature.

HORACE E. MARTIN.